Patented May 30, 1950

2,509,418

UNITED STATES PATENT OFFICE 2,509,418

PROCESS OF PRODUCING FLOUR

Dan H. Brown, Chicago, Ill.

No Drawing. Application January 14, 1947,
Serial No. 722,086

4 Claims. (Cl. 241—8)

The present invention relates to a process for producing flour from cereals and, more particularly, to a process for making flour containing substantially all the vitamins, oils and fats present in the cereal, a substantial portion of which is lost under present milling processes. Another objects is to provide a process for producing flour that will not become rancid, that will have a superior flavor and that will contain substantially all the flour contained in the cereal.

Hereinafter reference will be made to flour made from wheat and a process of producing the same, but the invention is applicable to flour produced from other cereals.

Under present day milling operations, the highest yield of patent or first grade flour is usually not more than 80% of the total of the flour produced, and is frequently considerably less. Even first grade flour contains only about 50% of the vitamins, oils and fats available in the wheat berry, the greater part of these constituents being lost during the milling process.

Recently attempts have been made to produce a non-rancidifying wheat flour containing substantially all the flour from the endosperm and germ and most of the vitamins, oils and fats. These attempts have uniformly failed, however, to retain the important vitamins, oils and fats of the berry, particularly those contained in the germ and aleurone cells. Such attempts are illustrated in Miller et al. United States Patent No. 2,018,966 issued October 29, 1935 and Australian Patent No. 110,532 issued to Morris Mills, Inc. These two patents disclose a milling process wherein the flour is continually aerated during all the milling operations (but not in the conditioning operations) to cool the flour to an unspecified extent and to eliminate the various impurities causing rancidification. The flour produced by these methods, however, contains no more of the vitamins, fats and oils than is contained in flour produced by standard milling processes.

I have discovered that this is because the processes disclosed in these patents fail to preserve the fat, oil and vitamin contents of the berry for at least the following reasons: (1) The milling is such as to rupture the individual cells of the germ, endosperm and aleurone. (2) The aleurone cells which are between the endosperm and the first coat of bran are soluble in water, are dissolved with their vitamin B₁ content in the tempering water.

I have found that it is essential not to crush or break the individual cells of the germ and endosperm or the aleurone cells, but to grind the germ, endosperm and aleurone in such manner that the individual cells are separated from each other rather than crushed. When this is done, little or none of the oil in these cells is freed to be lost or to cause rancidification or to become absorbed by the bran. The above results can be obtained by carefully controlling: (1) The temperature of the wheat berry prior to the milling operations and; (2) The temperature of the flour during the milling operations. The germ, endosperm and aleurone, if maintained below a certain temperature, which I will hereinafter refer to as the "brittle point" will fracture and be reduced to their individual cells without rupturing the cells. I have found that the brittle point of a wheat berry having a moisture content of 12 to 15% is between 80° to 85° F. If the moisture content is less, the brittle point will be a little higher and, if the moisture content is higher, the brittle point temperature will be lower. The Standard condition of wheat in the United States, however, is above 12 to 15 per cent moisture content, the lower point being preferable.

It is, of course, essential that the various grinding devices should be so separated as to not crush the cells. In normal practice the only device which will tend to crush these cells is the first break roll. Thereafter in most mills that I have become familiar with, the other rolls will not break the cells. Also, if the temperature of the wheat germ is below its brittle point, it will not be flattened out by the rolls and, thereafter lost from the flour with the bran as occurs in most mills today, but will be fractured or disintegrated into its individual cells along with the endosperm and aleurone cells.

I have also found that a new control of conditioning of the wheat berry is important in obtaining the above results. In the first place, the berry should be at least 90 days out of the field or artificially aged the equivalent thereof. Many means of aging grain are well known. One is disclosed in Alsop Patent No. 1,250,072, issued December 11, 1917. Hereafter I shall sometimes refer to such grain as "aged grain" if aged at least 90 days. It is necessary to clean and polish the wheat berry gently, inasmuch as rough or vigorous cleaning oftentimes frees a large proportion of the wheat germs.

The usual tempering process which consists of wetting the cleaned wheat for a period of anywhere from 12 to 24 hours results in the solution of many or all of the aleurone cells, resulting in the loss of a large part of the vitamin B₁ complex of the berry. The water which dissolves these cells is absorbed in the bran, and the vitamins are discarded therewith. If the wheat is tempered for a short time, this will not occur. The amount of time necessary for tempering depends upon the temperature of the air and of the tempering water. If the temperature is very low, the tempering may continue almost indefinitely, but for normal temperatures of 60–80° F. the tempering operations should never exceed 4 to 8 hours. In any event, the temperature of the berries and water should not be allowed to exceed 80° to 85° F., and at such temperatures a tempering of 4–8 hours is sufficient to soften the outer bran layers so as to permit their ready removal and at the same time prevent the water from reaching the aleurone cells. Such berries shall sometimes hereinafter be referred to as "bran softened."

It is essential that the temperature of the wheat berries when delivered to the first break rolls should never exceed the brittle point and that these rolls be so separated that they will fracture or cut, rather than crush, the germ or endosperm and aleurone. In fact, if the temperature of the wheat berry materially exceeds the brittle point, the germ will merely become flattened out and during the other processes of the milling operation will be separated with the bran. The proper distance between the break rolls will vary with the size and variety and condition of the wheat berries being milled and with the different type of rolls being used. An experienced miller, however, will have no difficulty, when instructed to do so, in arranging his rolls so that the germ, endosperm and aleurone will be fractured and the cells thereof will not be crushed.

The apparatus and aerating process of the above mentioned patents or the equivalent thereof are also necessary in connection with my process, inasmuch as it is essential to remove the undesirable and rancidifying elements of the wheat berry such as dirt, and dust, particularly the placental dust, which cannot be removed during the conditioning operations, and to maintain a low temperature of the flour being milled. The Australian patent in particular discloses an excellent method and apparatus for removing these undesirable elements by aeration and for maintaining a low temperature in the flour during milling. However, the patentees did not appreciate the importance of maintaining the flour below the brittle point of the various cells thereof.

When the normal temperature of a mill would exceed 80–85° F., it will be necessary to include a cooling system to keep the temperature below such brittle point.

After the berries have gone through the first break roll, further operations to separate the cells to flour fineness and to remove the dirt, bran and other non-flour producing parts of the berries can be conducted in accordance with the processes of the above mentioned patents, but in most mills their standard procedures can be followed and apparatus used provided the mill is equipped with means for aerating the flour and with means for maintaining the temperature of the berries below the brittle point at the time they enter the first break roll. Substantially all of the flour produced by the mill may be blended together and it is not necessary to separate the flours into straight or patent flours and lower grade flours. The flow of the mill, however, may be adjusted to segregate these flours as desired.

The 100% flour, i. e., all the flour produced by the process from the germ, endosperm and aleurone, produced by my process has a most desirable flavor as it includes all the fats, oils and vitamins in the wheat berry. The color is a brownish white rather than a dead white, but if desired may be bleached white with substantially no loss of the vitamins, fats, and oil contents. It is very definitely non-rancidifying and may be stored for long periods without deterioration. When only selected parts of the wheat berry are contained in the flour the color is whiter, a creamy white. In such flour, the percentage of fats, oils and vitamins remains the same as in the 100% flour; that is, if the selected stock contains 75% of the flour produced, it will contain 75% of these constituents of the berry. In other words, the germ and aleurone cells are substantially evenly distributed with the endosperm.

The following is a specific example of my process:

1. Wheat berries 90 days out of the field or aged the equivalent thereof are selected and gently cleaned and polished.

2. The berries are then tempered by spraying water on them for a period from 4 to 8 hours and the temperature of the berries is maintained at below 85° F.

3. The berries are then delivered to the first break roll and such temperature is again maintained, the break roll being spaced apart sufficiently to fracture the berries but not to crush the germ, endosperm and aleurone cells.

4. The crushed berries are then milled in the manner disclosed in Australian Patent No. 110,532 or the equivalent thereof; i. e., the flour is continuously aerated to maintain the temperature thereof below approximately 85° F., and to blow off the dirt, dust and other rancidifying and undesirable components while the various components of the berries are segregated and the flour cells are separated; i. e., reduced without fracturing the cells to flour fineness.

The resulting flour contains substantially all the flour cells of the berries in separated but unbroken condition, and with the fats, oil and vitamin contents thereof in their natural places, inside the cells, where they will enhance the value of the flour without any rancidifying effects.

The foregoing detailed description has been given for clearness of understanding only, and no unnecessary limitations should be understood therefrom.

I claim:

1. The process of producing germ flour from wheat berries having germ, aleurone and endosperm portions and an outer bran layer which comprises: selecting berries which have been aged at least ninety days out of the field, tempering the berries from four to six hours with water and maintaining the temperature of the berries at 60° to 80° F. during the tempering, passing the berries through a plurality of break and reduction rolls of which the break rolls have been separated sufficiently to pass the germ in its normal form and of which the reduction rolls have been separated sufficiently to reduce the germ, aleurone and endosperm to flour fineness, and maintaining the berries at a temperature below approximately 85° F. from a time at least subsequent to tempering and prior to the delivery of the berries to the first break rolls and until the process is terminated and including aeration of the berries during passage thereof through the break and reduction rolls.

2. The process of producing germ flour from cereal grain having germ, aleurone and endosperm portions and an outer bran layer which comprises: selecting grain which has been aged at least ninety days out of the field, tempering the grain from four to six hours with water and maintaining the temperature of the grain at 60° to 80° F. during the tempering, passing the grain through a plurality of break and reduction rolls of which the break rolls have been separated sufficiently to pass the germ in its normal form and of which the reduction rolls have been separated sufficiently to reduce the germ, aleurone and endosperm to flour fineness, and maintaining the grain at a temperature below approximately 85° F. from a time at least subsequent to tempering and prior to the delivery of the grain to the first break rolls and until the process is terminated and including aeration of the grain during passage thereof through the break and reduction rolls.

3. The process of producing germ flour from wheat berries containing germ, endosperm and aleurone portions and an outer bran layer, which comprises: tempering berries which have been aged at least ninety days out of the field the equivalent of four to eight hours with water so that there is no substantial dislocation of the vitamin content of the aleurone portion into the bran, passing the berries through a plurality of break rolls which have been separated a sufficient distance to reduce the berries but permit the germ to pass therethrough in its normal form, passing the reduced berries through a plurality of reduction rolls, all of which have been separated a sufficient distance to reduce the germ, endosperm and aleurone to flour fineness, and maintaining the temperature thereof below the brittle point of approximately 85° F. from a time prior to the delivery of the berries to the first break rolls and until all reduction has been completed and including aeration of the berries during passage thereof through the break and reduction rolls.

4. The process of producing germ flour from cereal grain containing germ, endosperm and aleurone portions and an outer bran layer, which comprises: tempering grain which has been aged at least ninety days out of the field the equivalent of four to eight hours with water so that there is no substantial dislocation of the vitamin content of the aleurone portion into the bran, passing the grain through a plurality of break rolls which have been separated a sufficient distance to reduce the grain but permit the germ to pass therethrough in its normal form, passing the reduced grain through a plurality of reduction rolls, all of which have been separated a sufficient distance to reduce the germ, endosperm and aleurone to flour fineness, and maintaining the temperature thereof below the brittle point of approximately 85° F. from a time prior to the delivery of the grain to the first break rolls and until all reduction has been completed and including aeration of the grain during passage thereof through the break and reduction rolls.

DAN H. BROWN.

REFERENCES CITED

The following references are of record in the file of this patent:

UNITED STATES PATENTS

| Number | Name | Date |
|---|---|---|
| Re. 17,829 | Dienst | Oct. 14, 1930 |
| 1,123,347 | Miller | Jan. 5, 1915 |
| 1,163,168 | Patterson | Dec. 7, 1915 |
| 1,916,773 | Shaler | July 4, 1933 |
| 2,018,966 | Miller | Oct. 29, 1935 |
| 2,230,417 | Wellinghoff | Feb. 4, 1941 |
| 2,278,459 | McCashen | Apr. 7, 1942 |
| 2,413,472 | Sullivan | Dec. 31, 1946 |

FOREIGN PATENTS

| Number | Country | Date |
|---|---|---|
| 110,532 | Morris Mills (Australia) | May 6, 1940 |

OTHER REFERENCES

Flour Milling by J. F. Lockwood, published 1945 by the Northern Publishing Co., Ltd., New York; Office 230, Produce Exchange. Pages 100, 203. Patent Office Library Designation TS2145.L6.

The Consolidated Grain Milling Catalogs; edition No. 4, 1937; published by the American Miller; page 316.

Wheat & Flour Quality, by C. O. Swanson; published by Burgess Publishing Co., Minneapolis, Minn. 1938; pages 119 to 128, 133, 134, 156, 157, 163, 164.

The Consolidated Grain Milling Catalogs; edition No. 4, 1937, published by the American Miller; page 316.

Wheat and Flour Quality, by C. O. Swanson; published by Burgess Publishing Co., Minneapolis, Minn. 1938; pages 119 to 128, 133, 134, 156, 157, 163, 164.

Miller, Edgar S. Milling Studies, 1928, pub. by Nat'l Miller, Chicago, Illinois., Wheat Sections under the Microscope and Wheat Parts and Products Highly Magnified, Plates I and II, opposite page 192, and page 195.

Melick, Readers Digest, April 1940, pages 23 to 26.

Pusch, American Miller, Feb. 1945, pages 30 and 32.